US012579165B2

(12) United States Patent
Liu et al.

(10) Patent No.: US 12,579,165 B2
(45) Date of Patent: *Mar. 17, 2026

(54) RESTRICTED BLOCKCHAIN CLUSTER

(71) Applicant: Lendingclub Bank, National Association, San Francisco, CA (US)

(72) Inventors: Jianju Liu, Kentfield, CA (US); Aaron Jimenez, San Diego, CA (US); Wenxuan Xu, San Mateo, CA (US); Jianglan Han, San Francisco, CA (US)

(73) Assignee: Lendingclub Bank, National Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,458

(22) Filed: Jul. 16, 2024

(65) Prior Publication Data

US 2024/0370458 A1 Nov. 7, 2024

Related U.S. Application Data

(63) Continuation of application No. 18/206,763, filed on Jun. 7, 2023, now Pat. No. 12,197,465, which is a (Continued)

(51) Int. Cl.
*G06F 16/00* (2019.01)
*G06F 16/27* (2019.01)

(52) U.S. Cl.
CPC ............ *G06F 16/27* (2019.01); *G06F 16/273* (2019.01); *G06F 16/275* (2019.01)

(58) Field of Classification Search
CPC ...... G06F 16/27; G06F 16/273; G06F 16/275; G06F 16/2379
See application file for complete search history.

(56) References Cited

U.S. PATENT DOCUMENTS 11,790,353 B2 * 10/2023 Kim ................... G06Q 20/3678
705/69
2012/0266121 A1 * 10/2012 Newcomb ........... G06F 30/3323
716/109

(Continued)

FOREIGN PATENT DOCUMENTS

WO WO-2023193783 A1 * 10/2023

OTHER PUBLICATIONS

Liu, U.S. Appl. No. 17/871,436, filed Jul. 22, 2022, Notice of Allowance and Fees Due Mailed on Mar. 6, 2023.

(Continued)

*Primary Examiner* — Alexander Khong
(74) *Attorney, Agent, or Firm* — Invoke

(57) ABSTRACT

Techniques are provided for tracking a number of transactions-of-interest in a transaction-recording blockchain using a control blockchain. A transaction-of-interest is a transactions that is in a particular state. A request to perform an action is received. Upon receiving the request and determining that the action corresponds to a new transaction-of-interest, a control blockchain is checked to determine the current number of transactions-of-interest in the transaction-recording blockchain and maximum allowed number of transaction-of-interest for the transaction-recording blockchain. In response to determining that the current number of transaction-of-interest in the transaction-recording blockchain are less than the maximum allowed: allowing the action to occur, adding a new block to the transaction-recording blockchain, and updating the control blockchain to indicate the new number of transaction-of-interest. In response to determining that the current number of transaction-of-interest are at least at the maximum allowed number, prohibiting the addition of a new block to the transaction-recording blockchain.

15 Claims, 6 Drawing Sheets

Related U.S. Application Data continuation of application No. 17/871,436, filed on Jul. 22, 2022, now Pat. No. 11,709,864.

(56) References Cited

U.S. PATENT DOCUMENTS

| | | | | |
|---|---|---|---|---|
| 2017/0192942 | A1* | 7/2017 | Craik | G06F 40/137 |
| 2019/0266178 | A1* | 8/2019 | Madhavan | G06Q 40/04 |
| 2019/0268142 | A1* | 8/2019 | Leker | H04L 9/3239 |
| 2019/0289019 | A1* | 9/2019 | Thekadath | G06F 16/27 |
| 2020/0193419 | A1* | 6/2020 | Lin | H04L 9/008 |
| 2023/0298043 | A1* | 9/2023 | Orchard | G06Q 10/087 |
| | | | | 705/317 |
| 2024/0078577 | A1* | 3/2024 | Tietzen | H04L 9/0637 |

OTHER PUBLICATIONS

Mechkaroska et al., "Analysis of the possibilities for improvement of BlockChain technology", 2008, IEEE, pp. 4 (Year: 2008).

* cited by examiner

FIG. 2A
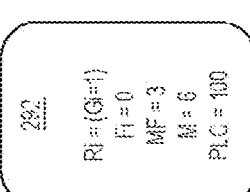
<u>Control Blockchain</u>
<u>292</u>
RI = (GI=1)
FI = 0
MF = 3
M = 6
PLC = 100
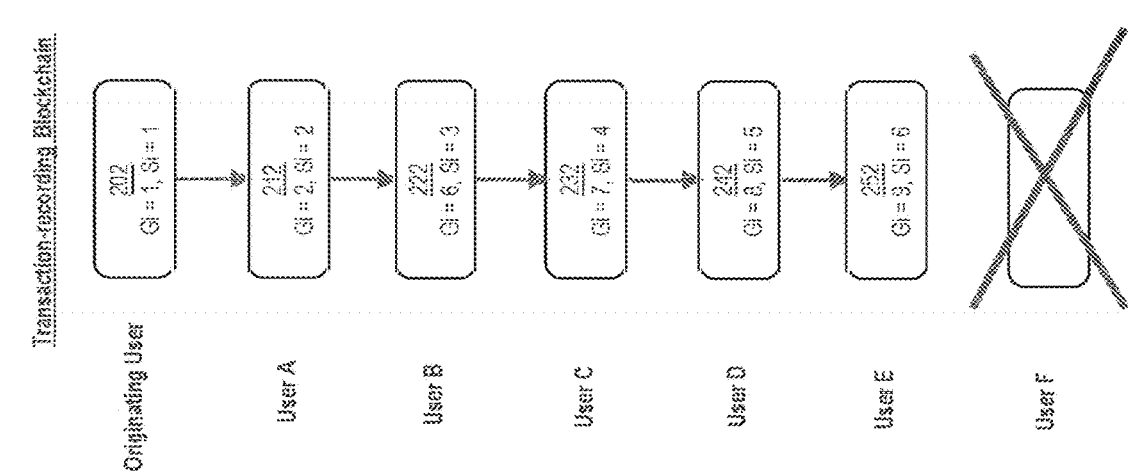
<u>Transaction-recording Blockchain</u>
| | | | | | | |
|---|---|---|---|---|---|---|
| <u>202</u> GI = 1, SI = 1 | <u>212</u> GI = 2, SI = 2 | <u>222</u> GI = 6, SI = 3 | <u>232</u> GI = 7, SI = 4 | <u>242</u> GI = 8, SI = 5 | <u>252</u> GI = 3, SI = 6 | |
Originating User     User A     User B     User C     User D     User E     User F

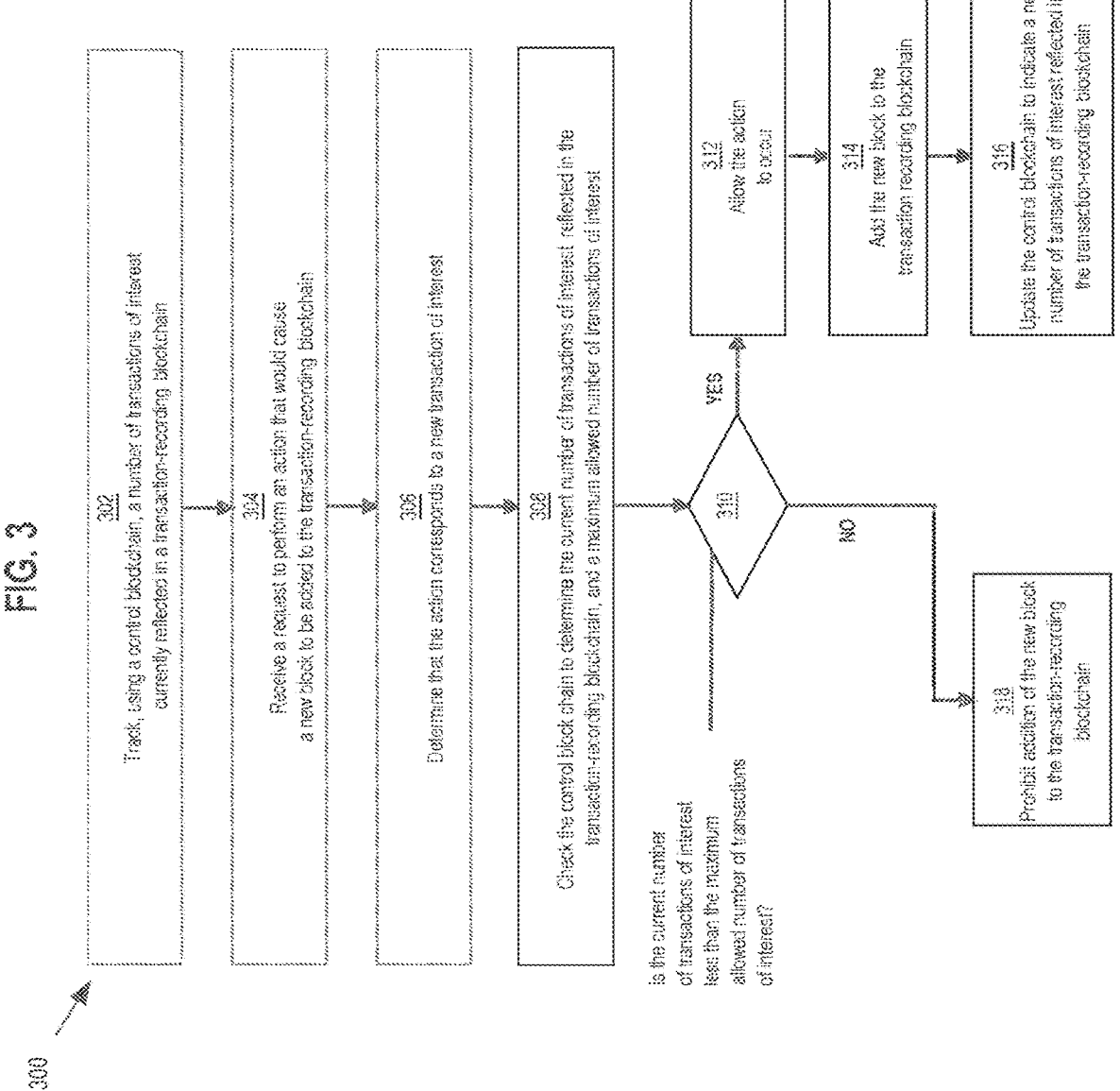

302
Track, using a control blockchain, a number of transactions of interest currently reflected in a transaction-recording blockchain 304
Receive a request to perform an action that would cause a new block to be added to the transaction-recording blockchain 306
Determine that the action corresponds to a new transaction of interest 308
Check the control blockchain to determine the current number of transactions of interest reflected in the transaction-recording blockchain, and a maximum allowed number of transactions of interest 310
Is the current number of transactions of interest less than the maximum allowed number of transactions of interest?

YES

312
Allow the action to occur

314
Add the new block to the transaction-recording blockchain

316
Update the control blockchain to indicate a new number of transactions of interest reflected in the transaction-recording blockchain

NO

318
Prohibit addition of the new block to the transaction-recording blockchain

Figure 4:
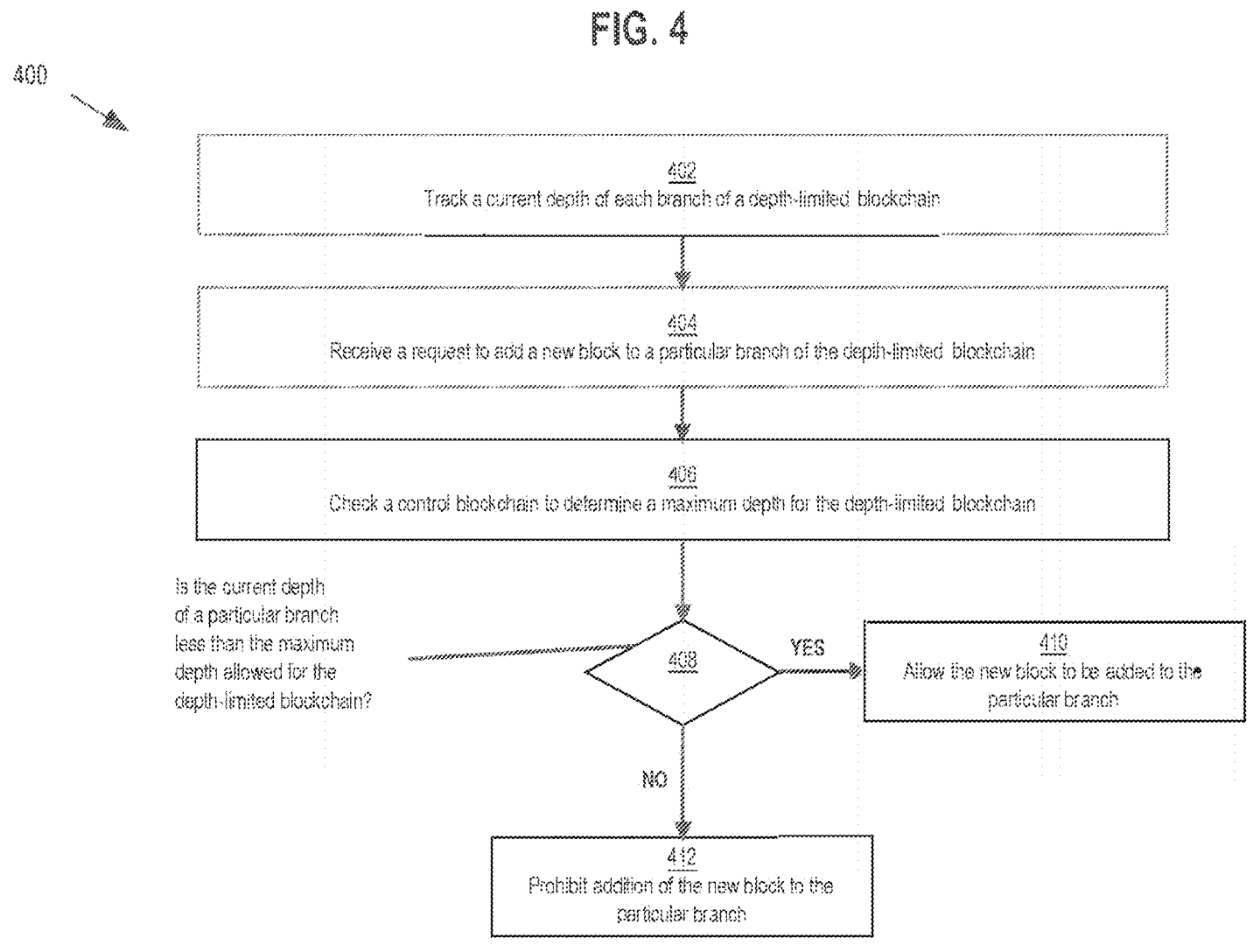

402
Track a current depth of each branch of a depth-limited blockchain

404
Receive a request to add a new block to a particular branch of the depth-limited blockchain 406
Check a control blockchain to determine a maximum depth for the depth-limited blockchain 408
Is the current depth of a particular branch less than the maximum depth allowed for the depth-limited blockchain?

YES

410
Allow the new block to be added to the particular branch

NO

412
Prohibit addition of the new block to the particular branch

RESTRICTED BLOCKCHAIN CLUSTER

This application claims the benefit as a continuation of application Ser. No. 18/206,763 filed on Jun. 7, 2023, which claims the benefit as a continuation of application Ser. No. 17/871,436, filed Jul. 22, 2022, by Jianju Liu et al. Each of the following applications are hereby incorporated by reference: application Ser. No. 18/206,763 filed on Jun. 7, 2023; Application Ser. No. 17/871,436 filed on Jul. 22, 2022. The applicant hereby rescinds any disclaimer of claims scope in the parent application(s) or the prosecution history thereof and advises the USPTO that the claims in the application may be broader than any claim in the parent application(s)

TECHNICAL FIELD

One technical field of the present disclosure relates to improved methods, systems, computer software, and/or computer hardware in the field of distributed transaction computer systems. More particularly, the technology herein relates to computer systems and processes that interface with a blockchain.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Blockchain technology has been used in certain digital currency implementations. An example implementation and techniques are described in a 2008 article by Satoshi Nakamoto, titled "Bitcoin: A Peer-to-Peer Electronic Cash System". Other information about the structure, function and implementation of blockchain and distributed ledger software and computing systems is widely available in public sources.

Recently, blockchain technology has gained prominence as a highly secure method for maintaining a myriad of transactions in multiple different applications and industries. For instance, blockchain-related benefits include increased transparency, governance, security, public access, and immutability. Examples of current uses of blockchain technology include implementing smart contracts, cybersecurity, supply chain monitoring, asset tracking and inventory management, cryptocurrencies, project collaboration, and project promotion.

However, processing blockchain transactions may become resource intensive as the blockchain grows. For example, if a blockchain is used to promote and track work on a collaborative public project in which there are several thousand participants, blockchain decryption for such blockchains may become resource intensive as the blockchain grows in size. As a result, performance of the blockchain may suffer, which may result in slow transaction processing and block decryption.

Based on the foregoing, it is desirable to have a mechanism for putting constraints on a blockchain to ensure blockchain performance without inhibiting the functionality of the blockchain.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A depicts an example illustration of blocks in the transaction-recording blockchain and the control blockchain for a sharing action, according to an embodiment.

FIG. 3 depicts a flowchart for tracking transactions of interest in the transaction-recording blockchain, according to an embodiment.

FIG. 4 depicts a flowchart for tracking depths of chains in a transaction-recording blockchain, according to an embodiment.

DETAILED DESCRIPTION

Figure 1:
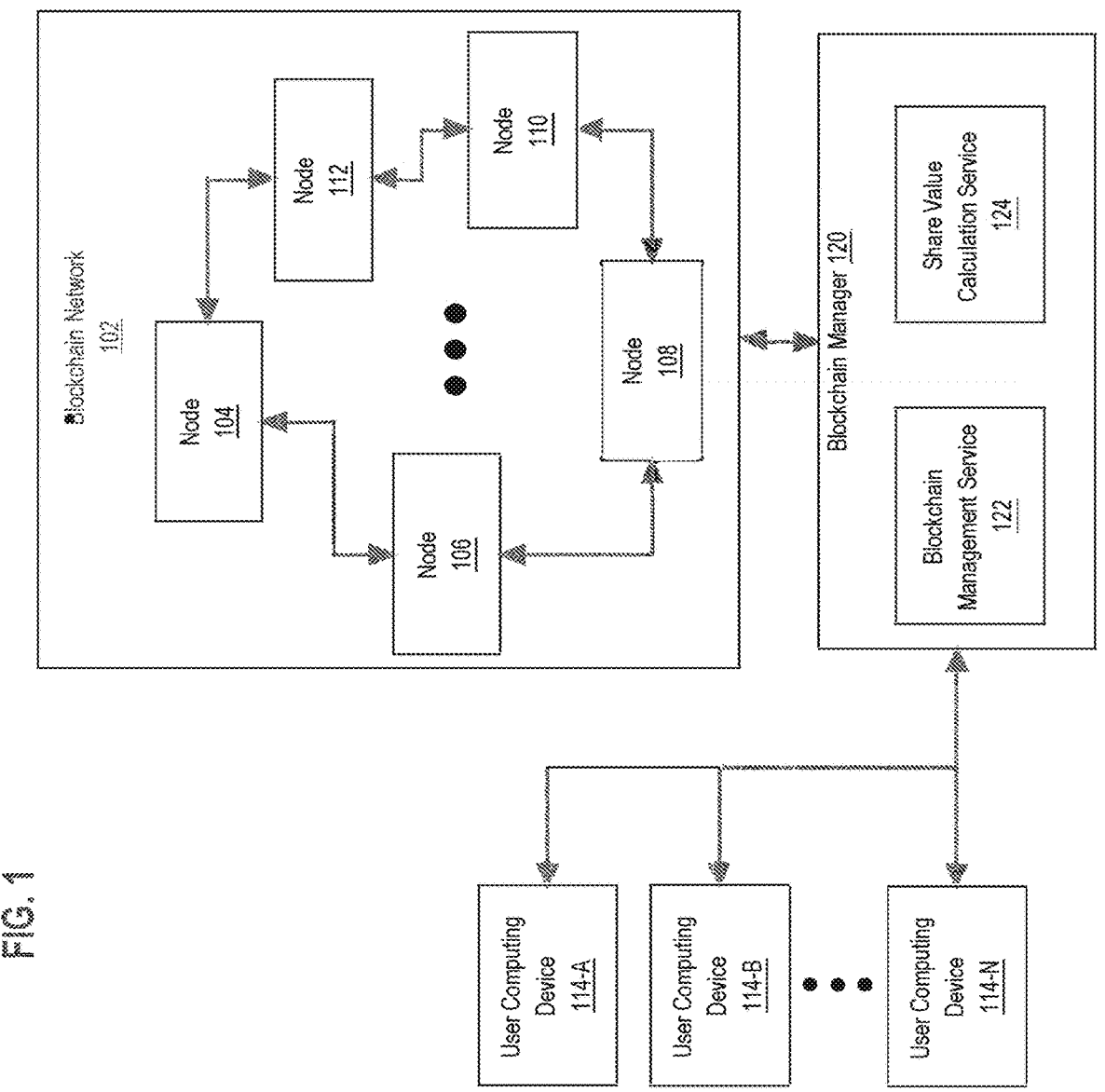
FIG. 1 depicts a blockchain network, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

One such solution to controlling resource costs associated with a blockchain is to limit the size or reach of the blockchain. However, limiting a blockchain based on the number of blocks may limit the functionality and/or purpose of the blockchain. For example, if a blockchain is used to track public project contributions from global contributors, limiting the number of blocks that can be added to the blockchain would restrict the number of participants in the project, thereby reducing the effectiveness of broadcasting and tracking the public project using blockchain.

Techniques are described herein for placing constraints on a blockchain without negatively impacting the functionality of the blockchain. In one implementation, the techniques involve tracking transactions of interest recorded in a transaction-recording blockchain. The transactions of interest recorded in the transaction-recording blockchain are tracked using a separately-maintained control blockchain.

In this context, "transactions of interest" may be any type of transaction/transaction-state combination. For example, in one implementation the transaction-recording blockchain may record information about job application transactions. A job application transaction may be in any one of multiple states, including a pending state, a denied state, and an accepted state. For the purpose of explanation, it shall be assumed that job application transactions that are in the "pending" start qualify as "transactions of interest".

Tracking the transactions of interest may involve keeping track of how many job application transactions (recorded in the transaction-recording block chain) are currently in the "pending" state. Thus, when the transaction-recording blockchain is updated to record that a job application transaction has entered the "pending" state, the control blockchain may be updated to increment the count of pending job application transactions. Similarly, when the transaction-recording blockchain is updated to transition a pending job application to an "accepted" or "denied" state, the control blockchain is updated to either increment or decrement the count of pending job application transactions. For instance, if a pending job application is denied, then the count of pending job application transactions may be decremented to account for the change in pending state of a job application. Alternatively, if a pending job application is accepted, then the count of pending job application transactions may be incremented to a value above a maximum allowed number of pending job application transactions in order to trigger the transaction-recording blockchain to deny any new pending job application transactions.

There is no limit to the nature of transactions with which the present techniques may be used. For example, other types of transactions may include applications to join a collaborative work project, applications for a home, car, or personal loan, requests to join a collaborative fitness project or goal, or any other transaction that may have distinct states, one or more of which are "of interest".

Temporarily Suspending the Recording of Transactions of Interest

By using the control blockchain to track the number of transactions of interest, conditions may be specified for temporarily suspending the addition of transactions of interest to the transaction-recording blockchain. For example, a maximum value may be specified on the number of pending applications. When the number of pending applications (as indicated in the control blockchain) reaches the maximum, then further attempts to record pending transactions in the transaction-recording blockchain are prevented.

In one implementation, a leaf block in the control blockchain may contain a value representing the current number of transactions of interest in the transaction-recording blockchain and the number of maximum allowed number of transactions of interest. When a request is received to add a new transaction of interest to the transaction-recording blockchain, the control blockchain may be checked to determine if the value of the current number of transactions of interest are less than then the maximum allowed number of transactions of interest. If the value is less than the maximum allowed number, then a new block may be added to the transaction-recording blockchain and a new block may be added to the control blockchain, where the new block in the control blockchain would contain a new value of the current number of transactions of interest and the maximum allowed number of transactions of interest.

In one example, the transaction-recording blockchain and the control blockchain may be used to track new users wishing to join a collaborative work project and to control the number of pending applications outstanding from the new users. The transaction-recording blockchain and the control blockchain would be used to track the number of pending applications for joining the collaborative work project, where each pending application would be reviewed by one or more members of the collaborative work project. When a new user submits an application to join the collaborative work project, the submission action may result in a new block being added to the transaction-recording blockchain, where the new block would contain a transaction of interest representing the application in a pending state. Prior to adding a new block to the transaction-recording blockchain, the control blockchain may be checked to determine that the current number of pending applications in the transaction-recording blockchain are less than the maximum allowed number of pending applications. If the current number of pending applications is less than the maximum allowed number of pending applications, then a block for the new application would be added to the transaction-recording blockchain. If however, the current number of pending applications is greater than or equal to the maximum allowed number of pending applications, then a new block representing the new application would not be added to the transaction-recording blockchain.

The one or more members of the collaborative work project may review a pending application, which is represented by a block in the transaction-recording blockchain, and determine whether to accept or deny the pending application. If the members deny the application, then the state of the application would change from pending to denied and that application would cease to be a transaction of interest, as only pending applications are being tracked. The value of the current number of pending applications in control blockchain would be decremented to reflect the denial of the application by adding a new block to the control blockchain that contains the new value for the current number of pending applications and the maximum allowed number of pending applications. Similarly, if the members approve the application, then the state of the application would change from pending to accepted and that application would cease to be a transaction of interest, as only pending applications are being tracked. Thus, the control block would be updated to decrement the number of pending transactions.

Permanently Halting the Recording of Transactions of Interest

As another example, the control blockchain may be used to specify a condition to permanently halt the addition of transactions of interest to the transaction-recording blockchain. For example, "accepted applications" may be transactions of interest. If there are only five positions open in the collaboration project, then a maximum value of 5 may be specified for the number of accepted applications. The control blockchain would be used to track the number of accepted applications, and to specify the maximum number of accepted applications. If the maximum value is 5, and the transaction-recording blockchain is updated to accept a fifth application, then the value of the current number of accepted applications in control blockchain would be updated to a value greater than or equal to the maximum number of accepted applications. By updating the value of the current number of accepted applications to be greater than or equal to the maximum allowed number of accepted applications, any subsequent requests to join the work project would be denied, effectively freezing the transaction-recording blockchain when five new members for the collaborative work project have been found.

Updates that do not Involve Transactions of Interest

Blocks may be added to the transaction-recording blockchain for actions other than submitting a new application. A new block may be added to the transaction-recording blockchain when a user shares the opportunity to join the collaborative work project with other users. For example, instead of submitting an application to join the project, a user may share the opportunity, via social media, with other users. The new block generated in the transaction-recording blockchain would not be used to update the current number of pending applications. Instead the new block may be used to track how the opportunity reaches a user that eventually submits an application. That is, the chain of blocks in the transaction-recording blockchain may be used as a log of how the opportunity was shared and who shared the opportunity with whom. The log of shares may then be used by members of the work project. For example, assume that the original opportunity was presented to user A. User A may have shared the opportunity with User B. User B may have shared the opportunity with User C. User C may have submitted an application. In this case, the blockchain may be used to determine that user C was referred by user B. Based on this information, user B may be contacted regarding user C's application.

In some situations, it may be desirable to reward users whose shares eventually result in an accepted application. Thus, in the scenario described above, users A and B may receive some reward if user C's application is accepted. Each time a user shares the opportunity with a new user, a new block would be added to the transaction-recording blockchain.

Branch-Depth Limiting Constraints

In an embodiment, size of any branch of the transaction-recording blockchain may be controlled by limiting the depth of any particular chain to a maximum number. For example, if a user shared the opportunity with several other users and those users subsequently shared the opportunity with more users, then the transaction-recording blockchain may grow rapidly. By limiting the number of times the opportunity may be subsequently shared, the processing resources needed for processing blocks in the transaction-recording blockchain may be controlled. Additionally, processing the transaction-recording blockchain to determine the number of transactions of interest may become resource intensive as the transaction-recording blockchain grows in size. However, by using a separate blockchain, the control blockchain, to track the number of transactions of interest in the transaction-recording blockchain, processing resources may be controlled.

Blockchain Network Overview

FIG. 1 depicts an embodiment of a blockchain network 102, which comprises a plurality of nodes 104, 106, 108, 110, 112, each of which may be implemented by a plurality of computing devices. Blockchain network 102 represents a computing environment for operating a decentralized framework that maintains a distributed data structure, which may be referred to herein as a secure distributed transaction ledger or a blockchain. This blockchain may support various functions, such as distributing computational tasks from one or more systems to one or more other systems, interfacing and sharing data with other blockchains, or tracking transactions of interest for one or more blockchains, among other functions.

To maintain the blockchain among the various nodes 104, 106, 108, 110, 112 in the blockchain network 102, a set of procedures are followed. Generally, such a network would suffer from inherent uncertainty and distrust between the nodes when they transact because they are typically unaffiliated with each other, may be transacting across vast distances, may be transacting anonymously, and because there is no centralized control or management to monitor or to resolve disputes. However, because the blockchain is maintained by each node 104, 106, 108, 110, 112 in the blockchain network 102 and because it is maintained according to set procedures that employ cryptographic methods and a consensus mechanism, the uncertain and distrust elements are mitigated.

Thus, the secure distributed transaction ledger, or blockchain, is a ledger maintained collectively by the nodes 104, 106, 108, 110, 112 in blockchain network 102. The blockchain may comprise a system of blocks containing digital data that are interconnected by reference to the previous block. The blocks can hold digital data including file transfer data, transaction data, message data, smart contract data, consensus data that ensures that the state of the blockchain is valid and is endorsed by the majority of the record keeping systems, and/or other information as desired. Each block may include a link to the previous block and may include a timestamp. Furthermore, all confirmed transactions are included in the blockchain and are done so using cryptography. This way, the integrity and the chronological order of the blockchain are enforced and can be independently verified by each node.

Digital data may be received by one or more nodes in the blockchain network 102 for inclusion in the blockchain. This digital data may be grouped into transaction entries and made available to the nodes in the blockchain network 102. One or more computing devices, represented by blockchain manager 120 may be configured to connect to the blockchain network to publish digital data to blocks of the blockchain.

In an embodiment, blockchain manager 120 is implemented to manage blockchains within the blockchain network including, but not limited to, determining when to create a new transaction-recording blockchains and control blockchains, determining when to add new blocks to transaction-recording blockchains and control blockchains, determining which chain of blocks in a transaction-recording blockchain contains a block with a winning transaction, and how to calculate rewards for blocks that are part of the chain of blocks that contain the winning transaction. The blockchain manager 120 may include a blockchain management service 122 and a share value calculation service 124. In other embodiments, of the blockchain manager 120 may include more or less services. In an embodiment, the blockchain management service 122 is implemented to determine whether a new block should be added to a transaction-recording blockchain by reviewing the current number of transactions of interest and the maximum allowed number of transactions of interest stored in the control blockchain. For example, if a request to generate a new transaction of interest is received, the blockchain management service 122 may check the corresponding control block to determine if the current number of transactions of interest are less than the maximum allowed number of transactions of interest. If the current number of transactions of interest are less than the maximum allowed then the blockchain management service 122 may generate a new block representing the new transaction of interest.

In an embodiment, the blockchain management service 122 may limit the depth of a chain within the transaction-recording blockchain by checking the current depth of a particular chain of blocks against a maximum allowed depth of blocks for that transaction-recording blockchain. The control blockchain may be further configured to store the maximum allowed depth of blocks for the transaction-recording blockchain. For example, if the value of the maximum allowed depth of blocks stored in the control blockchain is 6 and the current depth of a particular chain of blocks in the transaction-recording blockchain is 6, then the blockchain management service 122 may not allow any new blocks to be added to the particular chain of blocks. If however, the current depth of the particular chain of blocks is 4, then the blockchain management service 122 may allow a new block to be added to the particular chain of blocks.

The transaction-recording blockchain may be used to track transactions of interest and determine when a particular transaction of interest converts into a desired transaction. Transactions of interest may represent transactions that have a particular state and a desired transaction may represent a transaction that is in a desired state. For example, if the transactions of interest represent loan applications in a pending state, then the desired transaction may represent when a pending loan applications changes into an accepted loan application or successful loan being established. When a transaction of interest converts into a desired transaction, the chain of blocks that include the particular block representing the desired transaction may be identified and each block may be awarded a share of a value, such as a reward share. For example, if the transaction-recording blockchain is used to track opportunities for establishing a new loan, where the opportunity is shared by users and blocks in the transaction-recording blockchain either represent a pending loan application or an instance of sharing the opportunity to create a loan application, then when a pending loan application becomes a successful loan, the chain of blocks that contain the successful loan may be identified for a reward disbursement.

In an embodiment, the share value calculation service 124 may be implemented to identify the blocks in a particular chain that contains the transaction that has a successful state and determine share values for a particular reward or equity allotted to users associated with blocks on the particular chain. The share value calculation service 124 may determine share values for each block in the particular chain by dividing an allotted share by the number of blocks in the chain. Alternatively, share value calculation service 124 may determine share values for each block in the particular chain by assigning weighted values to each block in the particular chain based upon their proximity to the block that contains the transaction that has a successful state.

In an embodiment, user computing devices 114-A, 114-B, 114-N represent user computing devices used to generate requests for actions on the transaction-recording blockchain. Requests for actions may include, but are not limited to, a request to create a new transaction of interest, a request to create a new block representing another action such as a share transaction, or any other request that may affect the transaction-recording blockchain. User computing devices 114-A, 114-B, 114-N may be implemented to communicate with the blockchain manager 120 to send requests for actions, receive notifications regarding existing transactions of interest, and receive notifications regarding share values awarded to blocks within the transaction-recording blockchain. User computing devices 114-A, 114-B, 114-N may implement Application Programming Interfaces (APIs) specific to communicating with the blockchain manager 120. In an embodiment, the user computing devices 114-A, 114-B, 114-N may represent any type of computing device including, but not limited to, a laptop, a desktop, a tablet, a smartphone, and any other computing device that implemented to communicate with the blockchain manager 120.

Loan Application Example

For the purpose of illustration, it shall be assumed that the transaction-recording blockchain and control blockchain, managed by the blockchain manager 120, are used for tracking pending loan applications for a current loan offer provided by an institution. However, tracking pending loan applications is merely one example of the virtually limitless use cases transaction-recording blockchains and control blockchains may be used to track. Other use cases may include job applications for employment or collaborative projects (e.g. control the number of pending applications), collaborative fitness goals (e.g. track user participants and their progress), academic goal participation (e.g. track students who participate in a project), and any other types of transactions in which the transactions have different types of states.

For the purposes of the current illustration, it shall be assumed that users may cause a new block to be created in the transaction-recording blockchain when either a user initiates a new loan application or when the user shares the loan offer, provided by the institution, with other users. The control blockchain may be used to track the status of the number of pending loan applications currently in the transaction-recording blockchain. In an embodiment, data stored in blocks in the control blockchain may include, but are not limited to, current number of pending loan applications, a maximum allowed number of pending loan applications, a maximum depth for any chain of blocks starting from the root, and a token identifier used to identify a particular block within the transaction-recording blockchain that contains information about an issued loan (successful loan application). Other embodiments of the control blockchain may contain fewer or more information pertinent to the current loan offer provided. For example, the control blockchain may include a share value that may be disbursed to users associated with blocks that are part of the winning chain. The winning chain refers to the chain of blocks that contains a block associated with a newly issued loan. Since the purpose of tracking pending loan applications is to reward the promotion (sharing) and filing of a successful loan application, each user within the winning chain contributed to securing a successfully issued loan. For example, each user that shared the loan offer with other users (within the chain) contributed to finding the particular user that applied for the loan and was successful in receiving the issued loan.

Transaction-Recording Blockchain

In an embodiment, blocks within the transaction-recording blockchain may store a transaction block ID ($G_i$), a block depth value ($Si$), and other user information used to identify the user associated with a particular block. Transaction block ID, $G_i$, may represent a unique identifier for a particular block in the transaction-recording blockchain. The block depth value, $S_i$, may represent a number of blocks in a chain, which includes the particular block, starting from the root block. The $S_i$ may be used to identify the current depth of a particular chain and to determine whether the particular chain may allow another block to be added or whether the particular chain is limited based on the current depth value. In other embodiments, the $S_i$ may not be stored within each block of the transaction-recording blockchain. Instead, the blockchain management service 122 may calculate the depth of a particular block when needed. Other user information stored within a block of the transaction-recording blockchain may include any information used to identify the user associated with the particular block, such as a user's name, email address, user ID, or any other social media identifier.

Control Blockchain

In an embodiment, blocks within the control blockchain may store information used to control the size of the transaction-recording blockchain including, but not limited to: a transaction recording block ID ($R_i$), a current number of pending transactions of interest ($F_i$), a maximum allowed pending transactions of interest ($M_F$), a maximum allowed chain depth (M), and a current rewards value ($P_{LC}$).

In an embodiment, the transaction recording block ID ($R_i$), stored in a control block, may represent a block identifier identifying a block from the transaction-recording blockchain. When the transaction-recording blockchain is initially created, the $R_i$ in the first control block of the control blockchain may refer to the root block of the transaction-recording blockchain, referring to an originating user. Subsequent control blocks created in the control blockchain may have $R_i$ referring to the root block of the transaction-recording blockchain until a winning block is identified. A winning block is a block in the transaction-recording blockchain that refers to a user whose loan application was accepted and resulted in an issued loan. Once a winning block in the transaction-recording blockchain is identified, the control blockchain may be updated so that $R_i$ identifies the winning block. The control blockchain is updated by adding a new child control block that contains a new value for the $R_i$ referring to the winning block.

In an embodiment, the current number of pending transactions of interest attribute ($F_i$) refers to the number transactions of interest tracked within the transaction-recording blockchain. For example, $F_i$ may refer to the current number of loan applications initiated as a result of the originating user sharing the loan offer. Initiated loan applications may represent transactions that are in a pending state (transactions of interest). When a user initiates a new loan application, the $F_i$ may be incremented. Conversely, when a pending loan application is denied, the $F_i$ may be decremented. As stated previously, updating values tracked in the control blockchain are reflected in a newly created child control block that contains the updated attribute values. For instance, each time a new loan application is initiated, a loan application is denied, or a loan application is approved, a new control block is created in the control blockchain to reflect the updated value of $F_i$.

In an embodiment, the maximum allowed pending transactions of interest ($M_F$) refers to the upper limit of pending loan applications tracked allowed in the transaction-recording blockchain. The $M_F$ is used to effectively control the number of transactions of interest in the transaction-recording blockchain. When a request to open a new loan application is received by the blockchain management service 122, the blockchain management service 122 checks the leaf control block of the control blockchain to determine whether the $F_i$ is less than the $M_F$. If the $F_i$ is less than the $M_F$, then a new loan application (which may be tracked) may be created. If however, the $F_i$ is greater than or equal to the $M_F$, then the new loan application would not be created and tracked. In an embodiment, if the $F_i$ is greater than or equal to the $M_F$ the user requesting to create a new loan application may be notified that their new loan application would not qualify for the current loan offer and will not be tracked. However, the user may still be able to create a new loan application, except the new loan application would not be eligible for any benefits associated with the transaction-recording blockchain.

In an embodiment, the maximum allowed chain depth (M) refers to the depth limit for any given chain within the transaction-recording blockchain. M is used to control the depth of chains within the transaction-recording blockchain. For example, when a request to share the loan offer is received from a user, the blockchain management service 122 checks whether the block depth value, Si, stored in the leaf block of the current chain of the transaction-recording blockchain is less than the M stored in the leaf control block. If the $S_i$ for the current chain is less than the M, then that means the current depth of the current chain is less than the maximum allowed depth for chains in the transaction-recording blockchain and a new block may be added to the current chain of the transaction-recording blockchain. If however, the Si is greater than or equal to the M, then the current chain depth has reached the maximum allowed limit and the request to share the loan offer, for the purposes of adding a new block to the transaction-recording blockchain would be denied.

The current loan offer rewards share value ($P_{LC}$) refers to a total share value allotted to users that are part of the winning chain of blocks that contain a winning block. The winning chain of blocks refers to blocks, from the transaction-recording blockchain, that are part of the chain that contains the winning block, where the winning block refers to the user whose loan application was accepted and resulted in an issued loan. Each user that is part of the winning chain, other that the user represented by the winning block, represents a user that shared the loan offer with other users and resulted in finding the user represented by the winning block.

The $P_{LC}$ may then be divided and shared with each user that is part of the winning chain. In an embodiment, the $P_{LC}$ value may represent a monetary award that may be distributed to each user in the winning chain. For example, the $P_{LC}$ value may be equally divided and shared amongst users in the winning chain. In other examples, each user may receive a weighted share based on their proximity to the winning block. For instance, a user who's sharing directly resulted in a friend applying for a loan application and receiving an issued loan may receive a greater share than the other users up the winning chain.

Initiating New Blockchains

In an embodiment, a new transaction-recording blockchain and control blockchain may be created in response to an action by an originating user who has been invited to perform the action. For example, an entity that provides loan offers, may invite one of their existing customers to participate in a new loan offer promotion asking their existing customers to share the new loan offer with other people in their network. For the purposes of this example, existing customers invited to share the new loan offer promotion may be referred to as an originating user, because when an originating user shares the new loan offer promotion with other people, a new transaction-recording blockchain and control blockchain pair are created. The new transaction-recording blockchain and control blockchain pair are used to track users who share the new loan offer that originated from the originating user and to track pending loan applications initiated as a result of the originating user sharing the new loan offer. For example, if loan offers are provided to 100 existing customers (100 originating users) to share the loan offers with people in their respective networks, then upon sharing the new loan offers, 100 new transaction-recording blockchain and control blockchain pairs may be created to track each of the loan offers originating from each of the 100 originating users. That is, once an originating user shares the new loan offer with people in their network, root nodes are created in the transaction-recording blockchain and the control blockchain. Examples of sharing may include, but are not limited to, sharing a loan offer promotion link via email, Facebook, Twitter, Instagram, or any other social media platform.

Different user actions may result in a new block being added to the transaction-recording blockchain. In an embodiment, a new block may be added to the transaction-recording blockchain when either (1) a user requests to share the loan offer with other users, or (2) a user requests to start a new loan application based on the loan offer.

Request to Share

When a specific user (user A) views a loan offer shared by another user, user A may have the option to either further share than loan offer with other users within user A's network or apply for a new loan based on the loan offer. For example, if the originating user emails the new loan offer to 3 of his friends, including user A, and user A clicks on the loan offer link, user A may be prompted with options to either further share the loan offer with others or to apply for a loan application represented by the loan offer itself. In an embodiment, the loan offer link presented to user A may contain information identifying the transaction block ID ($G_i$) referring to the originating user. When user A selects the option to further share the loan offer, the blockchain management service 122 may use the $G_i$ to locate the specific block and specific chain in the transaction-recording blockchain referring to the user that shared the loan offer with user A, in this case the originating user. The blockchain management service 122 may then determine whether the block depth value, Si, for originating user is less than the maximum allowed chain depth, M, stored in the leaf control block of the control blockchain. Since the originating user is represented by the root block, the $S_i$ value of the originating user's block would have a value of 1. If the M stored in the leaf control block is equal to 6, then the blockchain management service 122 would determine that the $S_i$ is less than the M and would allow user A to share the loan offer with others. When user A shares the new loan offer with others, the blockchain management service 122 would create a new child block linked to the originating user's block in the transaction-recording blockchain. The new child block would receive a new transaction block ID, $G_i$, and would have a $S_i$ value of 2 indicating the depth of the current chain.

FIG. 2A depicts an example illustration of blocks in the transaction-recording blockchain and the control blockchain for a sharing action, according to an embodiment. The transaction-recording blockchain starts at the root block 202, which is created when the originating user initially shared the loan offer with another user (user A). The root block 202 has $G_i=1$ and $S_i=1$. If user A subsequently requested to share the loan offer with another friend (user B), then blockchain management service 122 would check the current chain depth (represented by block 202's $S_i=1$) and the leaf control block 292, in the control blockchain, to determine that the current chain depth of block 202 is less than the maximum allowed chain depth, M=6 (from leaf control block 292). As a result, the blockchain management service 122 would create block 212 in the transaction-recording blockchain representing the allowance of user A to share the loan offer with user B.

Subsequent share requests by user B and other users would also be checked by the blockchain management service 122 to determine whether the current blockchain depth of a chain (the $S_i$ of the leaf block on a chain) is less than the maximum allowed depth, M, in the leaf control block 292. The blockchain management service 122 would deny a request to share the loan offer when the current blockchain depth of a chain is greater than or equal to the maximum allowed depth, M, represented in the leaf control block 292.

For example, if user E, represented by block 252, had successfully shared the loan offer with another user, user F, and user F requests to share the loan offer with one or more friends, then the blockchain management service 122 would compare the current blockchain depth of the current chain to the maximum allowed depth, M, in the leaf control block 292. The current leaf block, representing user E, is block 252, which has a $S_i$ equal to 6. The blockchain management service 122 would compare the $S_i$ from block 252 to the maximum allowed depth, M, in the leaf control block 292 and determine that the $S_i$ is equal to M and thus deny the request, by user F, to share the loan offer because the maximum allowed depth for the chain in the transaction-recording blockchain has reached its limit ($S_i=M$).

Request to Apply for Loan Offer

A second type of user request received by the blockchain management service 122 is a request to start a new loan application based on the loan offer. Upon receiving a request to start a new loan application, the blockchain management service 122 checks the current number of transactions of interest (current number of pending loan applications) against the maximum allowed transactions of interest (maximum number of allowed pending loan applications) in the control blockchain. For instance, if the current number of pending loan applications is less than the maximum number of allowed pending applications, then the blockchain management service 122 will allow the new loan application and create a new blockchain representing the user that opened a new loan application.

Figure 2B:
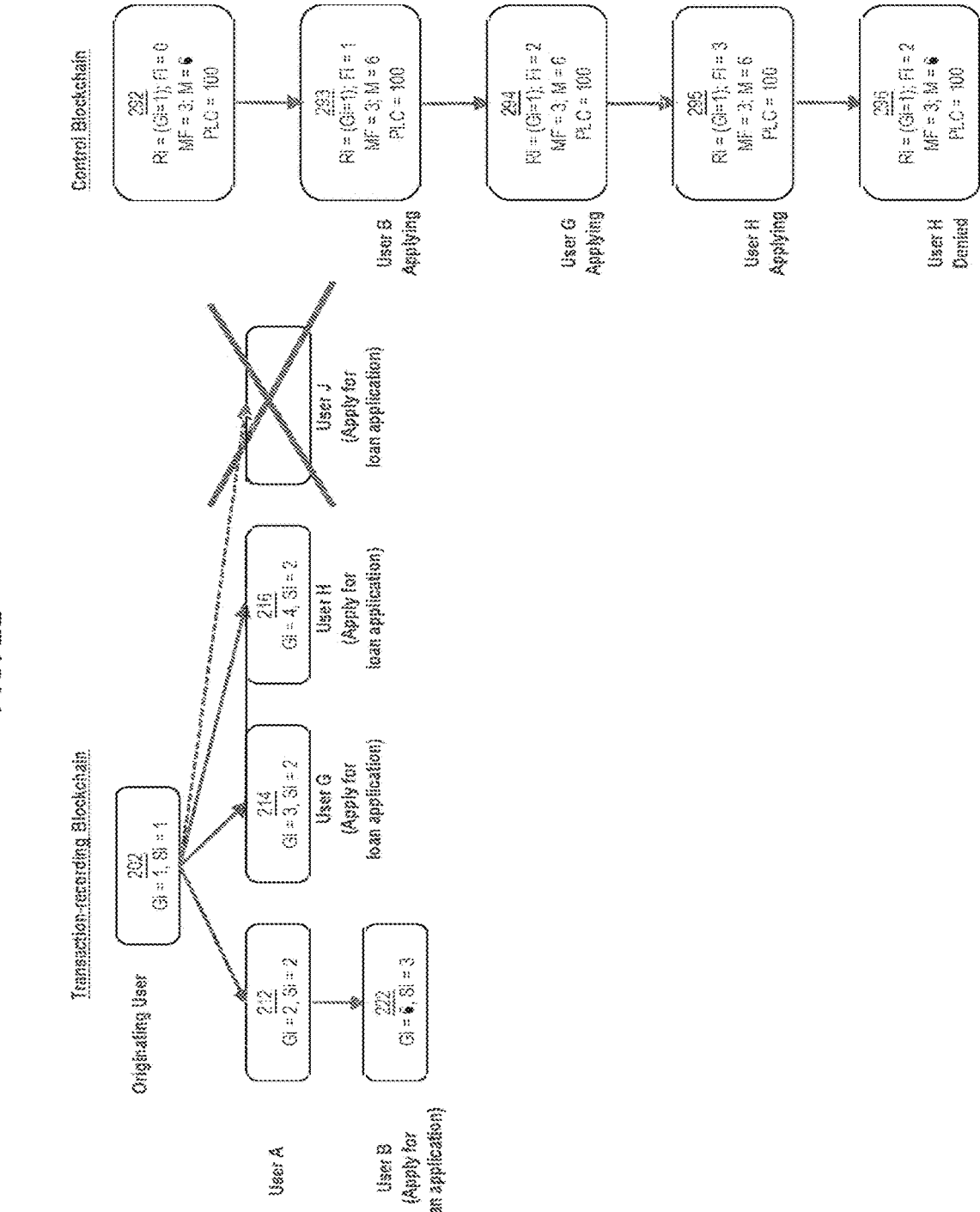
FIG. 2B depicts an example illustration of blocks in the transaction-recording blockchain and the control blockchain for a new transaction of interest action, according to an embodiment.

FIG. 2B depicts an example illustration of blocks in the transaction-recording blockchain and the control blockchain for a new transaction of interest action, according to an embodiment. The transaction-recording blockchain starts at the root block 202, which is created when the originating user initially shared the loan offer with another users (user A, user G, user H, and user J). The root block 202 has $G_i=1$ and $S_i=1$. If user A successfully shared the loan offer with user B, then the blockchain management service 122 would generate block 212. The control blockchain would contain leaf control block 292, which has attributes $R_1=(G_i=1)$ for the root block, $F_i=0$ as no pending loan applications exist yet, $M_F=3$ as the maximum number of pending loan applications is 3, M=6 as the max chain depth is 6, and $P_{LC}=100$ which is a share value for the transaction-recording blockchain.

If user B requests to open a new loan application, the blockchain management service 122 would receive the request and check the current number of pending loan applications against the maximum allowed number of loan applications, represented by:

IF ($F_i<M_F$) {Allow new block}
ELSE {Deny block} where $F_i$ and $M_F$ are retrieved from the current leaf control block 292.

In this case, the blockchain management service 122 would determine that $F_i=0$ is less than $M_F=3$ and create a new child block (block 222) in the transaction-recording blockchain under block 212 as user B's loan application is a result of user A sharing the loan offer to user B. In an embodiment, the blockchain management service 122 would update the control block to reflect the new pending loan application by generating a new child control block (control block 293). Control block 293 would contain an updated $F_i=1$.

If two more loan applications are opened (user G and user H), the blockchain management service 122 would update the $F_i$ value for each new loan application by creating new child control blocks 294 and 295, respectively ($F_i=2$ in control block 294 and $F_i=3$ in control block 295).

If however, user J attempts to open a new loan application after users B, G, and H have pending loan applications, then the blockchain management service 122 would determine that the maximum number of pending loan applications has reached the limit. For instance, the blockchain management service 122 would check control block 295 and determine that the $F_i$ is not less than the $M_F$ (where $F_i=3$, $M_F=3$ in control block 295), and would refuse to create a new block for user J's in the transaction-recording blockchain. In an embodiment, when the $F_i=M_F$ in the leaf control block, the transaction-recording blockchain is effectively frozen from tracking any new pending applications. The transaction-recording blockchain may be able to track a new loan application if one of the pending loan applications is subsequently denied, thus changing from a pending state to a denied state.

Pending Loan Denied

In an embodiment, if a transaction of interest ceases to be a transaction of interest, then the blockchain management service 122 may decrement the $F_i$ value reflected in the leaf control block of the control blockchain. For example, if user H's pending loan application is denied, then user H's loan application would not be in a pending state. Referring back to FIG. 2B, the blockchain management service 122 would generate a new child control block 296 that contains an updated $F_i=2$, where the $F_i$ represents the remaining pending loan applications for user B and user G. Based on the new $F_i$ value in the child control block 296, the transaction-recording blockchain may be able to add a new block representing a new pending loan application if a new user submits a new loan application.

Newly Issued Loan

In an embodiment, if a transaction of interest ceases to be a transaction of interest because the transaction of interest becomes a desired transaction, then the blockchain management service 122 may update the $F_i$ value to a value greater than the $M_F$. For example referring to FIG. 2B, if a pending loan application such as user G's loan application is successful and becomes a newly issued loan for user G, then user G's loan application would not be in a pending state. As a result, the transaction-recording blockchain would become permanently frozen, as the goal of the transaction-recording blockchain is to track loan offer shares until a new loan is issued. Once the new loan is issued, the blockchain management service 122 would generate a new child control block that has an updated $F_i=F_i+M_F$. For instance, control block 296 contains a value for $F_i=2$, where the pending applications include user H's application (block 216) and user B's application (block 222). The newly created control block would set the $F_i$ value equal to 5 ($F_i=F_i$ (2)+$M_F$ (3)). By setting the new value of $F_i$ to a value equal to $F_i+M_F$, if remaining pending loan applications are denied, such as user H's application and user B's application, the $F_i$ would only be decremented by 2, leaving the value of $F_i$ equal to 3, which is still equal to $M_F$ thereby effectively permanently freezing the transaction-recording blockchain from adding new pending loan applications.

In an embodiment, in addition creating a new child control block with an updated $F_i=F_i+M_F$, the blockchain management service 122 updates the transaction recording block ID, $R_i$, to point to the winning block. Referring back to FIG. 2B where user G (block 214) is the winning node, the blockchain management service 122 would generate a new child control block that has $R_i=(G=3)$, which references block 214.

In another embodiment, the transaction recording block ID, $R_i$, may be set to a token value, Ti, where the token value is a concatenation of the transaction block ID, $G_i$, and block depth value, $S_i$, for the winning block 214. By storing a token value that contains both the transaction block ID and the block depth value, the share value calculation service 124 may locate the winning block and winning chain and may use the block depth value to divide the rewards share value ($P_{LC}$) amongst the number of blocks in the chain.

Share Value Calculation

In an embodiment, upon determining that a new loan has been issued, the share value calculation service 124 may apply a reverse pie split algorithm to evenly distribute the rewards share value ($P_{LC}$) to each block in the winning chain. The share value calculation service 124 may identify the winning block's transaction block ID, $G_i$, and block depth value, $S_i$, from the child control block in the control blockchain. Specifically, if the $R_i$ is equal to token value, Ti, the share value calculation service 124 may derive the $G_i$ and $S_i$. After determining the winning block using the $G_i$, the share value calculation service 124 may traverse up the transaction-recording blockchain, from the winning block to the root block to identify the set of blocks that make up the winning chain.

In an embodiment, the share value calculation service 124 may determine share values for each block in the winning chain by applying the reverse pie split algorithm, as:

$$P = P_{LC}$$
$$\text{for } (; i > 0; i\text{--}):$$
$$P_i = P/i;$$
$$P = P - P_i$$

where P equals the current rewards share value, $P_{LC}$ equals the total share value, i equals the block depth value from $S_i$, and $P_i$ equals the rewards share value for a block at the i block depth value.

Using the above algorithm, where $P_{LC}=100$, the block depth value for the winning block ($S_i$) equals 6 the share values calculated for each block at each depth value would be:

| Block depth $S_i$ | Reward share value for block | Remaining reward share total |
|---|---|---|
| 6 | $P_{LC}/6 = 16.67$ | $P_6 = P_{LC} - P_{LC}/6 = 83.33$ |
| 5 | $P_{LC}/5 = 16.67$ | $P_6 = P_{LC} - P_{LC}/5 = 66.66$ |
| 4 | $P_{LC}/4 = 16.67$ | $P_6 = P_{LC} - P_{LC}/4 = 49.99$ |
| 3 | $P_{LC}/3 = 16.67$ | $P_6 = P_{LC} - P_{LC}/3 = 33.32$ |
| 2 | $P_{LC}/2 = 16.67$ | $P_6 = P_{LC} - P_{LC}/2 = 16.67$ |
| 1 | $P_{LC}/1 = 16.67$ | 0 | where each block in the chain of 6 blocks would receive an equal share value of the total share value $P_{LC}$.

In another embodiment, the share value calculation service 124 may determine weighted share values for each block in the winning chain by applying the reverse pie split algorithm, as:

$$P = P_{LC}$$
$$\text{for } (; i > 0; i\text{--}):$$
$$\text{weight} = (i * (i + 1))/2$$
$$P_i = P * i/\text{weight};$$
$$P = P - P_i$$

where P equals the current rewards share value, $P_{LC}$ equals the total share value, i equals the block depth value from $S_i$, $P_i$ equals the rewards share value for a block at the i block depth value, weight equals a calculated weight based on the proximity of a block to the winning block. For instance, the block that is a parent block to the winning block would receive a greater weight than a block that is a grandparent block to the winning block Using the above algorithm, where $P_{LC}=100$, the block depth value for the winning block $(S_i)$ equals 6 the share values calculated for each block at each depth value would be:

| Block depth $S_i$ | Weight W | Remaining reward share total | Reward share value for block |
|---|---|---|---|
| 6 | $(S_6*(S_6+1))/2 = 21$ | $P = 100$ | $P_6 = P * S_6/W_6 = 28.57$ |
| 5 | $(S_5*(S_5+1))/2 = 15$ | $P = P - P_5 = 71.42$ | $P_5 = P * S_5/W_5 = 23.80$ |
| 4 | $(S_4*(S_4+1))/2 = 10$ | $P = P - P_4 = 46.61$ | $P_4 = P * S_4/W_4 = 19.04$ |
| 3 | $(S_3*(S_3+1))/2 = 6$ | $P = P - P_3 = 28.57$ | $P_3 = P * S_3/W_3 = 14.28$ |
| 2 | $(S_2*(S_2+1))/2 = 3$ | $P = P - P_2 = 14.28$ | $P_2 = P * S_2/W_2 = 9.52$ |
| 1 | $(S_1*(S_1+1))/2 = 1$ | $P = P - P_1 = 4.76$ | $P_1 = P * S_1/W_1 = 4.76$ | where the winning block $(S_1)$ in the chain of 6 blocks would receive a share value of 28.57 of the total share value P=100, the parent block $(S_5)$ of the winning block would receive a share value of 23.80, the next parent block $(S_4)$ would receive a share value of 19.04, the next parent block $(S_3)$ would receive a share value of 14.28, the next parent block $(S_2)$ would receive a share value of 9.52, and the next parent block $(S_1$ the root block) would receive a share value of 4.76. In yet other embodiments, the share value calculation service 124 may apply any other type of share calculation algorithm to calculate a share value of each block in the winning chain.

Process Overview-Tracking Transactions of Interest

FIG. 3 depicts a flowchart for tracking transactions of interest in the transaction-recording blockchain, according to an embodiment. The process described may be performed by a single program or multiple programs. The steps of the process as shown in FIG. 3 may be implemented using processor-executable instructions that are stored in computer memory. For the purposes of providing a clear example, the steps of FIG. 3 are described as being performed by computer programs executing on the blockchain manager 120. For the purposes of clarity, the process described may be performed with more or fewer steps than described in FIG. 3.

At step 302, the blockchain manager 120 tracks, using a control blockchain, a number of transactions of interest. Using the loan offer example, a transaction of interest may represent a loan application in a pending state. In other examples, a transaction of interest may be any type of transaction that has a particular state.

At step 304, the blockchain manager 120, receives a request to perform an action that would cause a new block to be added to the transaction-recording blockchain. In an embodiment, a user, using user computing device 114-A may send a request to the blockchain manager 120 to perform an action that would cause a new block to be added to the transaction-recording blockchain. For example, a user may make a request to open a new loan application.

At step 306, the blockchain manager 120, determines that the action corresponds to a new transaction of interest. For example, the blockchain manager 120 determines that the request to perform an action is a request to open a new loan application. Since the transaction-recording blockchain is configured to track pending loan applications, the request to open a new loan application is a transaction of interest.

At step 308, the blockchain manager 120, checks the control block chain to determine the current number of transactions of interest reflected in the transaction-recording blockchain and a maximum allowed number of transactions of interest. In an embodiment, the blockchain manager would access the leaf control block in the control blockchain to retrieve the current number of transactions of interest $(F_i)$ in the transaction-recording blockchain and the maximum allowed number of transaction of interest $(M_F)$ for the transaction-recording blockchain.

At decision diamond 310, the blockchain manager 120, determines whether the current number of transactions of interest is less than the maximum allowed number of transactions of interest. In an embodiment, the blockchain manager 120 would compare the values of $F_i$ and $M_F$ to determine whether the $F_i$ is less than $M_F$. For example referring to FIG. 2B, if the current leaf control block is control block 292, where $F_i=0$ and $M_F=3$, the blockchain manager 120 would determine that current number of transactions of interest is less than the maximum allowed number of transactions of interest and would proceed to step 312.

At step 312, the blockchain manager 120, allows the action to occur. For example, if the action was opening a new loan application, the blockchain manager 120 would allow the user to open a new loan application.

At step 314, the blockchain manager 120, adds a new block to the transaction-recording blockchain. In an embodiment, the blockchain manager 120 would create a new block in the transaction-recording blockchain representing the new transaction of interest (pending loan application). For example, in response to user B opening a new loan application, the blockchain manager 120 would create block 222 in the transaction-recording blockchain representing user B's new pending loan application.

At step 316, the blockchain manager 120, updates the control blockchain to indicate a new number of transactions of interest reflected in the transaction-recording blockchain. In an embodiment, the blockchain manager 120 would add a new control block to the control blockchain, where the new control block contains the updated number of transactions of interest reflected in the transaction-recording blockchain. For example, referring to FIG. 2B, . . . , the blockchain manager 120 would create control block 293 and set the current number of transactions of interest $F_i$ equal to 1.

Referring back to decision diamond 310, if the current number of transactions of interest was not less than the maximum allowed number of transactions of interest, the blockchain manager 120 would proceed to step 318. For example, referring to FIG. 2B, if the current leaf control block is 295, the $F_i$ is equal to 3 and the $M_F$ is equal to 3. At step 318, the blockchain manager 120, prohibits addition of the new block to the transaction-recording blockchain. For example, if user J requests to open a new loan application but, leaf control block 295 indicates that the current number of transactions of interest $(F_i=3)$ is not less than the maximum allowed number of transactions of interest $(M_F=3)$, then the blockchain manager 120 would not allow user J to open a new loan application.

Process Overview-Tracking Depth of Transaction-Recording Blockchain

FIG. 4 depicts a flowchart for tracking depths of chains in a transaction-recording blockchain, according to an embodiment. The process described may be performed by a single program or multiple programs. The steps of the process as shown in FIG. 4 may be implemented using processor-executable instructions that are stored in computer memory. For the purposes of providing a clear example, the steps of FIG. 4 are described as being performed by computer programs executing on the blockchain manager 120. For the purposes of clarity, the process described may be performed with more or fewer steps than described in FIG. 4.

At step 402, the blockchain manager 120 tracks current depth of each branch of a depth-limited blockchain. In an embodiment, the depth-limited blockchain may represent the transaction-recording blockchain where each block contains a block depth value $(S_i)$ which represents the number of blocks in a chain starting from the root block.

At step 404, the blockchain manager 120 receives a request to add a new block to a particular branch of the depth-limited blockchain. For example, the request to add a new block may be a share request to share a loan offer with other users.

At step 406, the blockchain manager 120 checks a control blockchain to determine a maximum depth for the depth-limited blockchain. For example referring to FIG. 2A, the blockchain manager 120 may check the leaf control block 292 of control blockchain to determine that the maximum depth M is equal to 6.

At decision diamond 408, the blockchain manager 120 determines whether the current depth of a particular branch is less than the maximum depth allowed for the depth-limited blockchain. For example, if the request to add a new block was based on a request from user E (prior to block 252 being created in FIG. 2A) to share a loan offer with user F, the blockchain manager 120 would determine whether the current depth of the particular branch (block 242 representing the current leaf block) is less than the maximum depth M. In this case, $S_i=5$ (from block 242) is less than M=6 (from control block 292), thus the blockchain manager 120 would proceed to step 410.

At step 410, the blockchain manager 120 allows the new block to be added to the particular branch. For example, block 252, representing user E's sharing would be added to the particular branch of the depth-limited blockchain. Block 252 would contain a current depth, $S_i$, equal to 6.

Referring back to decision diamond 408, if the blockchain manager 120 determines that the current depth of a particular branch is not less than the maximum depth allowed for the depth-limited blockchain, the blockchain manager 120 would proceed to step 412. For example, referring to FIG. 2A, if the request to add a new block was based on a request from user F to share a loan offer received from user E (block 252), the blockchain manager 120 would determine whether the current depth of the particular branch (from block 252) is less than the maximum depth M. In this case, the $S_i=6$ (from block 252) is not less than M=6 (from control block 292), thus the blockchain manager 120 would proceed to step 412.

At step 412, the blockchain manager 120 prohibits the addition of the new block to be added to the particular branch. For example, referring to FIG. 2A, user F's request to share the loan offer to others would be denied.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
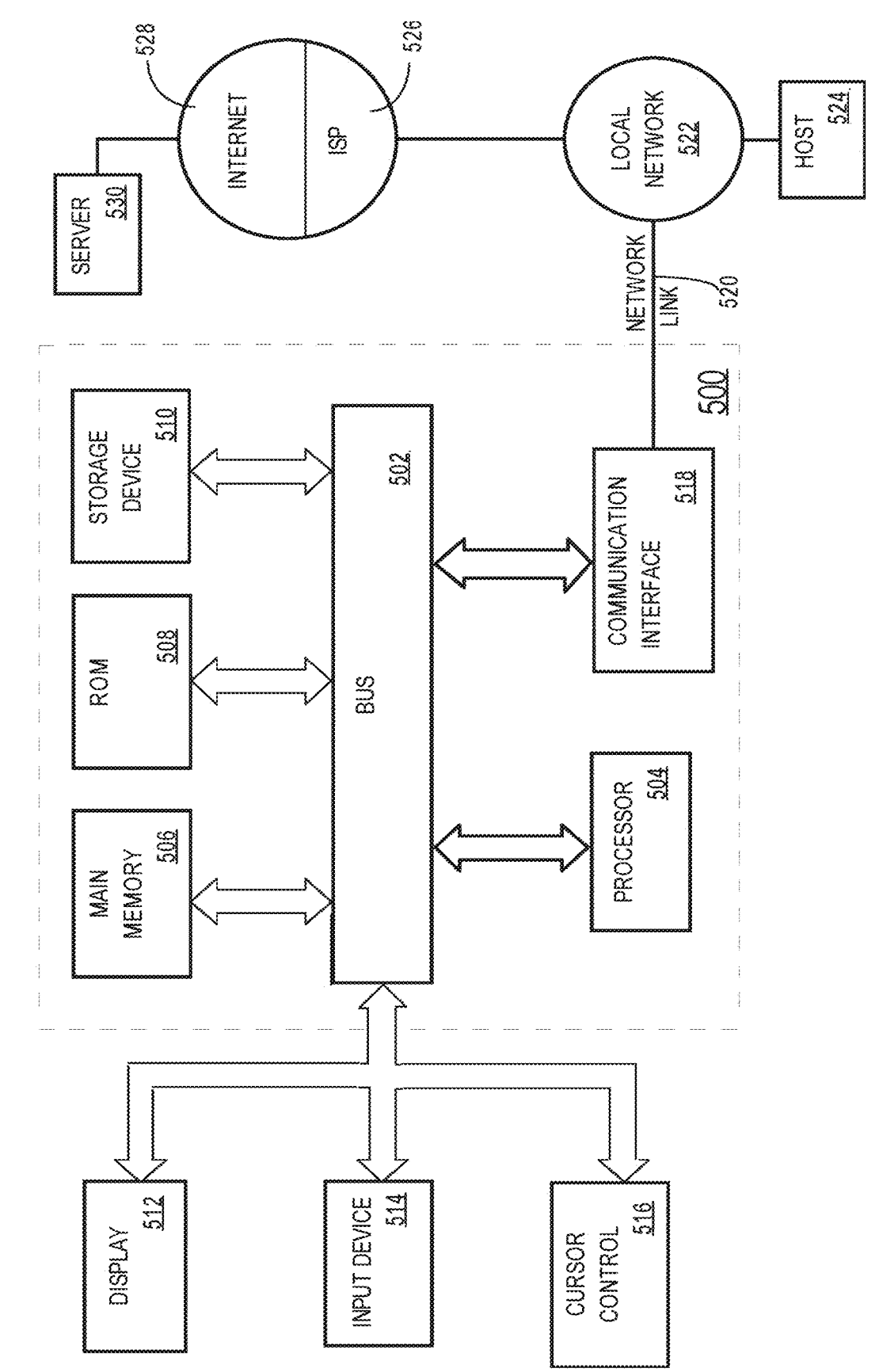
FIG. 5 depicts a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

storing, in a transaction blockchain, a plurality of transaction nodes, wherein each transaction node of the plurality of transaction nodes is associated with a transaction;

wherein the plurality of transaction nodes includes one or more root transaction nodes and one or more leaf transaction nodes, wherein each of the one or more leaf transaction nodes are associated with a root transaction node;

storing, in a control blockchain that is a separate and distinct blockchain from the transaction blockchain, a plurality of control nodes that are each associated with a transaction node;

wherein a first control node of the plurality of control nodes indicates a maximum allowed number of leaf nodes to be associated a first root transaction node of the plurality of transaction nodes;

in response to receiving a first request to add to the transaction blockchain a first leaf transaction node to be associated with the first root transaction node, adding the first leaf transaction node based at least in part on determining that adding the first leaf transaction node would not result in exceeding the maximum allowed number of leaf nodes to be associated a first root transaction node indicated by the first control node;

wherein the method is performed by one or more computing devices comprising one or more hardware processors.

2. The method of claim 1, wherein one or more control nodes are associated with root transaction nodes.

3. The method of claim 1, wherein two of the one or more leaf transaction nodes are associated with the same root transaction node.

4. The method of claim 1, further comprising:

in response to receiving a second request to add to the transaction blockchain a second leaf transaction node to be associated with the first root transaction node, prohibiting the addition of the second leaf transaction node based at least in part on determining that adding the first leaf transaction node would result in exceeding the maximum allowed number of leaf nodes to be associated with the first root transaction node, as indicated by the first control node.

5. The method of claim 1, wherein the first control node indicates the number of leaf transaction nodes associated with the first root transaction node.

6. One or more non-transitory computer readable media comprising instructions which, when executed by one or more hardware processors, cause performance of operations comprising:

storing, in a transaction blockchain, a plurality of transaction nodes, wherein each transaction node of the plurality of transaction nodes is associated with a transaction;

wherein the plurality of transaction nodes includes one or more root transaction nodes and one or more leaf transaction nodes, wherein each of the one or more leaf transaction nodes are associated with a root transaction node;

storing, in a control blockchain that is a separate and distinct blockchain from the transaction blockchain, a plurality of control nodes that are each associated with a transaction node;

wherein a first control node of the plurality of control nodes indicates a maximum allowed number of leaf nodes to be associated a first root transaction node of the plurality of transaction nodes;

in response to receiving a first request to add to the transaction blockchain a first leaf transaction node to be associated with the first root transaction node, adding the first leaf transaction node based at least in part on determining that adding the first leaf transaction node would not result in exceeding the maximum allowed number of leaf nodes to be associated a first root transaction node indicated by the first control node;

wherein the method is performed by one or more computing devices comprising one or more hardware processors.

7. The non-transitory media of claim 1, wherein one or more control nodes are associated with root transaction nodes.

8. The non-transitory media of claim 1, wherein two of the one or more leaf transaction nodes are associated with the same root transaction node.

9. The non-transitory media of claim 1, wherein the operations further comprise:

in response to receiving a second request to add to the transaction blockchain a second leaf transaction node to be associated with the first root transaction node, prohibiting the addition of the second leaf transaction node based at least in part on determining that adding the first leaf transaction node would result in exceeding the maximum allowed number of leaf nodes to be associated with the first root transaction node, as indicated by the first control node.

10. The non-transitory media of claim 1, wherein the first control node indicates the number of leaf transaction nodes associated with the first root transaction node.

11. A system comprising:

one or more hardware processors;

one or more non-transitory computer-readable media; and program instructions stored on the one or more non-transitory computer-readable media which, when executed by the one or more hardware processors, cause the system to perform operations comprising:

storing, in a transaction blockchain, a plurality of transaction nodes, wherein each transaction node of the plurality of transaction nodes is associated with a transaction;

wherein the plurality of transaction nodes includes one or more root transaction nodes and one or more leaf transaction nodes, wherein each of the one or more leaf transaction nodes are associated with a root transaction node;

storing, in a control blockchain that is a separate and distinct blockchain from the transaction blockchain, a plurality of control nodes that are each associated with a transaction node;

wherein a first control node of the plurality of control nodes indicates a maximum allowed number of leaf nodes to be associated a first root transaction node of the plurality of transaction nodes;

in response to receiving a first request to add to the transaction blockchain a first leaf transaction node to be associated with the first root transaction node, adding the first leaf transaction node based at least in part on determining that adding the first leaf transaction node would not result in exceeding the maximum allowed number of leaf nodes to be associated a first root transaction node indicated by the first control node.

12. The system of claim 1, wherein one or more control nodes are associated with root transaction nodes.

13. The system of claim 1, wherein two of the one or more leaf transaction nodes are associated with the same root transaction node.

14. The system of claim 1, wherein the operations further comprise:

in response to receiving a second request to add to the transaction blockchain a second leaf transaction node to be associated with the first root transaction node, prohibiting the addition of the second leaf transaction node based at least in part on determining that adding the first leaf transaction node would result in exceeding the maximum allowed number of leaf nodes to be associated with the first root transaction node, as indicated by the first control node.

15. The system of claim 1, wherein the first control node indicates the number of leaf transaction nodes associated with the first root transaction node.

* * * * *